United States Patent [19]

Fukunaga et al.

[11] Patent Number: 4,523,274

[45] Date of Patent: Jun. 11, 1985

[54] DATA PROCESSING SYSTEM WITH PROCESSORS HAVING DIFFERENT PROCESSING SPEEDS SHARING A COMMON BUS

[75] Inventors: Yasushi Fukunaga, Hitachi; Tadaaki Bandoh, Ibaraki, both of Japan

[73] Assignee: Hitachi, Ltd., Tokyo, Japan

[21] Appl. No.: 250,644

[22] Filed: Apr. 3, 1981

[30] Foreign Application Priority Data

Apr. 4, 1980 [JP] Japan ................. 55-43496

[51] Int. Cl.³ .............................................. G06F 15/16
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,735,365 | 5/1973 | Nakamura et al. | 364/200 |
| 3,909,791 | 9/1975 | van den Berg | 364/900 |
| 3,950,729 | 4/1976 | Fletcher et al. | 364/200 |
| 4,014,006 | 3/1977 | Sorensen et al. | 364/200 |
| 4,223,380 | 9/1980 | Antonaccio et al. | 364/200 |
| 4,227,178 | 10/1980 | Gergaud et al. | 364/900 |
| 4,229,791 | 10/1980 | Levy et al. | 364/200 |
| 4,232,366 | 11/1980 | Levy et al. | 364/200 |
| 4,281,380 | 7/1981 | DeMesa, III et al. | 364/200 |
| 4,338,599 | 7/1982 | Leininger | 340/721 |
| 4,438,488 | 3/1984 | Shibayama et al. | 364/200 |
| 4,442,504 | 4/1984 | Dummermuth | 364/900 |

Primary Examiner—Harvey E. Springborn
Assistant Examiner—A. E. Williams, Jr.
Attorney, Agent, or Firm—Antonelli, Terry & Wands

[57] ABSTRACT

There is disclosed a data processing system comprising a plurality of processors having different processing speeds and connected with a synchronous common bus, the processors being able to access a common memory connected with the common bus.

A high frequency master clock signal generating means is provided in common for the processors of the system and the respective processors can be operated with the associated different machine cycles determined in accordance with the corresponding different processing speeds by frequency-dividing the master clock signal. In addition, each processor can be operated with different machine cycles depending on its operations.

7 Claims, 6 Drawing Figures

DATA PROCESSING SYSTEM WITH PROCESSORS HAVING DIFFERENT PROCESSING SPEEDS SHARING A COMMON BUS

BACKGROUND OF THE INVENTION

1. Field of the Invention

This invention relates to a data processing system in which a plurality of processors having different processing speeds are connected with a common bus so that they may respectively access the common memory connected with the common bus.

2. Description of the Prior Art

In the conventional data processing system of this kind, the respective processors share the common bus in a time sharing manner and are operated in a common machine cycle.

The transfer of data between the memory and the respective processors is performed during one machine cycle.

FIG. 1 is a time chart illustrating how a conventional synchronous common bus, which is controlled by a common clock signal, is used.

This time chart provides for a data processing system in which three processors A, B and C are connected with a common bus and in which bus occupation demands, data transfers and other operations are performed under the control of a common clock signal. In the operations of the processors A, B and C, the symbols A1, B1 and C1 respectively indicate that the corresponding processors A, B and C are delivering bus occupation demand signals. The symbols A2, B2 and C2 indicate that the processors A, B and C are performing data transfer operations. The symbols A3, B3 and C3 indicate that the processors A, B and C are performing other operations. One machine cycle covers a period from the rise of a clock pulse to the rise of the next clock pulse. Each processor executes a predetermined operation during the machine cycle. Each processor, permitted to use the common bus, occupies the bus for one machine cycle so that data may be transferred between the processor and the memory. These operations will be described below with the aid of FIG. 1. First, the processor B delivers a common bus occupation demand signal (B1) during a certain machine cycle and the use of the common bus is permitted for the processor B in the next machine cycle so that data is transferred (B2). If more than one of the processors deliver demand signals simultaneously, they are so controlled as to be sequentially selected one by one. This type of control system is disclosed in, for example, U.S. Pat. No. 4,232,366 and U.S. Pat. No. 4,229,791.

In each of the systems mentioned above, the processors and the common bus must have the same machine cycle. In the case, however, where each processor is a special-purpose processor which can be used only for its predetermined function, there occurs a difficulty. Namely, since all the processors are special-purpose apparatuses, the operation of one processor performed during its associated machine cycle is different from that of another processor performed during the corresponding machine cycle. One processor may execute a rather simple logic operation while another may perform a complicated operation. Accordingly, different operations are executed at different speeds for their respective machine cycles. If these machine cycles characteristic of the individual processors are to occur at the same period of time, the common machine cycle should be made long enough for the most complicated operation to be completed within one machine cycle. Otherwise, the complicated operations will have to be effected in two machine cycles. With the machine cycle thus determined, it becomes useless for each processor to complete an operation at its maximum speed, that is, in the shortest time possible. This is a considerable drawback of the resultant system.

On the other hand, if the common bus is permitted to be used in an asynchronous manner, that is, if each processor is operated for high speed processing, with its characteristic machine cycle independent of those of other processors, the aforementioned problem is avoided. However, because the processor accesses the common bus as frequently as once during several machine cycles, the overhead in the synchronization of the common bus occupation timing cannot be neglected, so that the performance of the system is degraded.

SUMMARY OF THE INVENTION

The primary object of this invention, which has been made to eliminate the above drawbacks, is to provide a data processing system in which processors having different processing speeds can be operated in different machine cycles, using a common bus of the synchronous type.

Another object of this invention is to provide a data processing system in which the period of transferring data through a common bus of the synchronous type can be controlled to any desired length of time and in which processors having different processing speeds can be operated in different machine cycles.

In order to attain the primary object, a high-frequency master clock signal generator is provided for common use in the data processing system using a common bus of the synchronous type and the data processing system is so designed as to be able to select a desired one of machine cycles derived by frequency-dividing the master clock signal.

To attain the second object of this invention, there is provided in the data processing system an inhibition signal generator for generating a signal to inhibit the operation of a gate controlling a bus control circuit during the period of data transfer on the common bus.

DESCRIPTION OF THE PREFERRED EMBODIMENT

Figure 1:
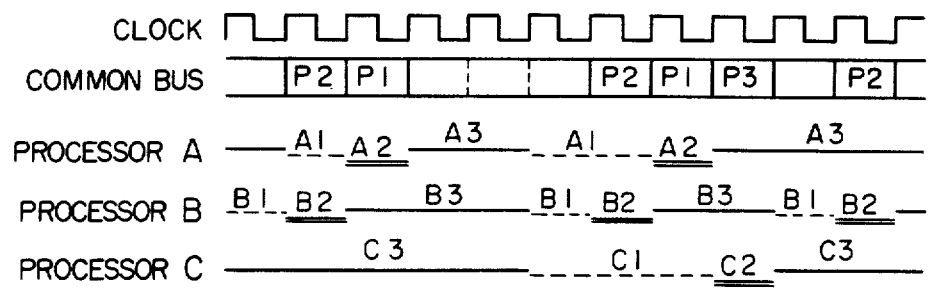
FIG. 1 is a time chart illustrating how a conventional common bus of the synchronous type is used.
Figure 2:
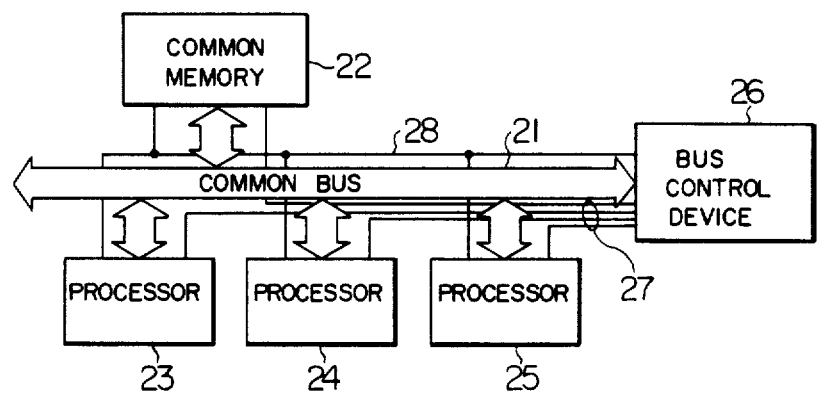
FIG. 2 is a block diagram of a data processing system which forms an embodiment of this invention.

In FIG. 2, reference numeral 21 designates a common bus; 22 a common memory connected with the common bus 21; 23, 24 and 25 processors connected with the common bus 21; 26 a bus control device for controlling the common bus 21; 27 selection permission control lines; and 28 a master clock signal line.

In this embodiment, the processors 23 and 24, having the same processing speed, execute general programs. The processor 25, having a structure and a processing speed different from those of the processor 23 or 24, serves to control the I/O device.

The timing control of the processors 23-25 is performed on the master clock signal carried by line 28. A detailed description of the timing will be given later with the aid of FIGS. 4 and 5. Only the data transfer procedure will be briefly described here.

When common bus occupation demand signals are delivered at a predetermined timing, the bus control device 26 receives all the occupation demand signals from the processors and the memory 22 so as to control the selection of the common bus 21. For these plural demand signals, only one selection permission signal is delivered through the control line 27 to a desired processor or the common memory 22. The processor or the memory which receives the selection permission signal, occupies the common bus 21 and executes a data transfer operation, specifying the transfer end of the data.

For example, if data is required to be read out of the memory 22 and transferred to a desired processor, then the desired processor first occupies the common bus 21 and sends the corresponding address to the memory 22, and the memory 22, having read out the desired data, occupies the common bus 21 to send the read data to the processor.

The above series of operations are the same as those executed by the conventional data processing system, but the control of the selection of the common bus 21 and the timing of the data transfer are different from those in the conventional system. These differences will be explained below.

Figure 3A:
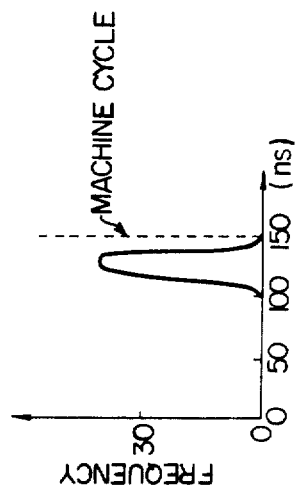
FIGS. 3A and 3B are characteristic diagrams which show the processing characteristics of two processors used for the explanation of this invention.
Figure 3B:
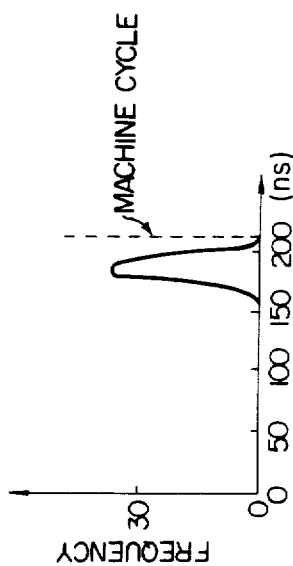

As described above, the processing speed of the processor 23 differs from that of the processor 25, owing to the differences in the number of the stages of arithmetic critical paths and in the operating speeds of the components used. FIGS. 3A and 3B show the spectral representations of their processing performances in terms of arithmetic processing.

FIG. 3A shows the distribution of the processing speed (execution speed) of the processor 23 and FIG. 3B shows the distribution of the processing speed (execution speed) of the processor 25.

FIGS. 3A and 3B respectively show suitable machine cycles for the processors 23 and 25, the machine cycles being long enough to cover the cycle times required to execute all the above operations. Namely, the preferable machine cycles are 150 ns for the processor 23 and 225 ns for the processor 25.

These machine cycles can be produced by frequency-dividing the frequency of the master clock signal 28. It is therefore preferable to set the period of the master clock signal 28 equal to 75 ns.

The processor 23 is provided with hardware which delivers a clock pulse each time it counts two clock pulses of the master clock signal 28, to generate a machine cycle of 150 ns, while the processor 25 is provided with hardware which delivers a clock pulse each time it counts three clock pulses of the master clock signal 28, to generate a machine cycle of 225 ns.

Now, the timing controls for the processors and the common bus will be described with the aid of FIGS. 4 and 5.

Figure 5:
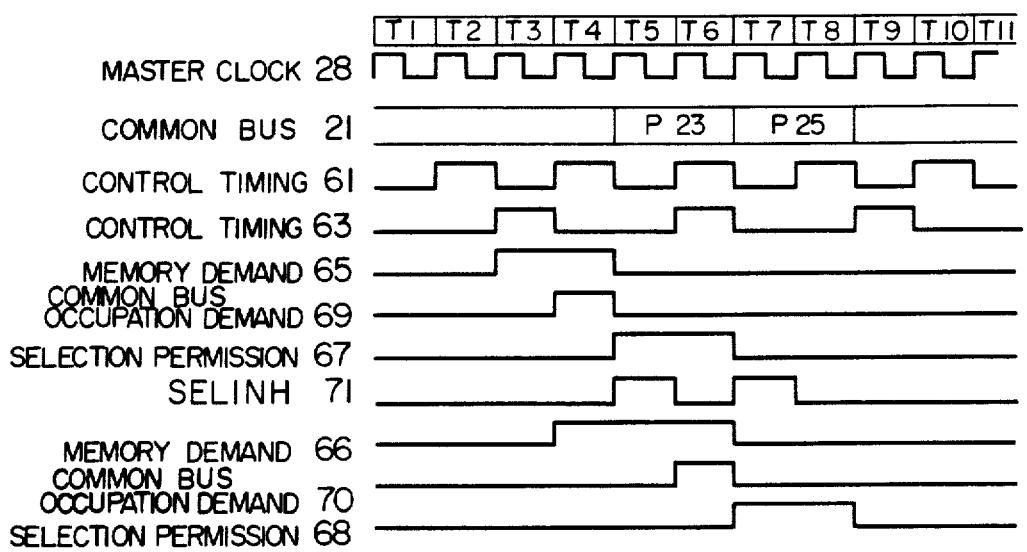
FIG. 5 is a time chart useful in explaining the operation of the circuit shown in FIG. 4.
Figure 4:
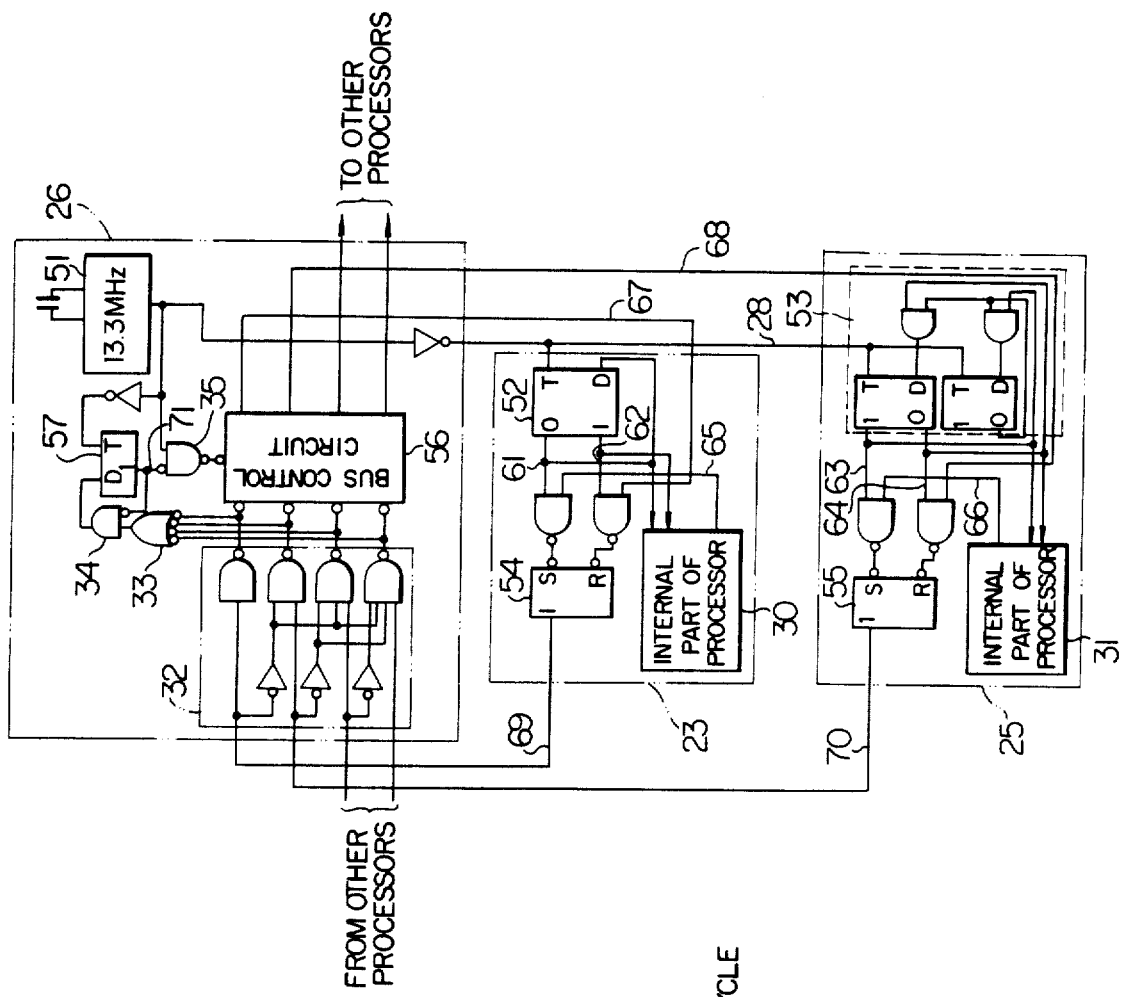
FIG. 4 is a schematic diagram showing in more detail certain portions of the circuit shown in FIG. 2.

FIG. 4 shows in block diagram detailed examples of the main portions of the circuit shown in FIG. 2 and FIG. 5 is a time chart useful in explaining the operation of the circuit shown in FIG. 4.

An oscillator 51 having an oscillation frequency of 13.3 MHz (i.e. cycle time of 75 ns) delivers a master clock signal 28, which is used in common for the bus control device 26 and the processors 23 and 25.

In the processor 23, the frequency of the master clock signal is halved by means of a frequency-dividing circuit 52, which may be, for example, a D-type flip-flop, so that timing signals 61 and 62 to control the internal part 30 of the processor 23 is generated. The timing signal 61 assumes the logic "1" in the later half of the machine cycle for the processor 23 while the timing signal 62 is logic "1" in the early half of the same machine cycle.

In the processor 25, on the other hand, the frequency of the master clock signal 28 is reduced to one third thereof by means of a frequency-dividing circuit 53 comprising two D-type flip-flops so that the timing signals 63 and 64 are generated. The timing signal 63 assumes the logic "1" in the later ⅓ part of the machine cycle for the processor 25 and the timing signal 64 is logic "1" in the early ⅔ part of the same machine cycle.

These timing signals 61 and 63, memory demand signals 65 and 66 for writing and reading, and selection permission signals 67 and 68 on the selection permission control lines 27 control the generation of common bus occupation demand signals 69 and 70 by the aid of flip-flops 54 and 55 of the set-reset type.

For the simplification of description, the cycles of the master clock signal are assumed to be named T1, T2, . . . , and T11, respectively, as shown in FIG. 5.

In the processor 23, two cycles of the master clock signal, i.e. T1 and T2 or T3 and T4, are jointly used as a machine cycle, and therefore the control timing signal 61 assumes the logic "0" in the cycle T1 and the logic "1" in the cycle T2. On the other hand, in the processor 25, three cycles of the master clock signal, i.e. T1, T2 and T3 or T4, T5 and T6, are jointly used as a machine cycle so that the control timing signal 63 assumes the logic "0" in the cycles T1 and T2 and the logic "1" in the cycle T3.

The processor 23 delivers the memory demand signal 65 in the machine cycle consisting of the cycles T3 and T4. The memory demand signal 65 is set in the flip-flop 54 at the beginning of the cycle T4 so that the common bus demand signal 69 is delivered. That is, the common bus demand signal 69 is delivered in synchronism with the master clock signal 28.

The signal 69, which has been produced at the beginning of the cycle T4, is delivered to the priority selection circuit 32. In the embodiment shown in FIG. 4, the system is so designed that the processor 23 has the top priority. Thus, when the common bus demand signal 69 is produced, the priority selection circuit 32 inhibits the common bus demand signals of the other processors to pass therethrough, and allows only the signal 69 to be applied to the bus control circuit 56. The content of the register 56 continues to be delivered as the selection permission signal 67 to the processor 23 during the cycle T5. In the cycle T4, the delivered signal 69 causes an OR gate 33 connected to the output of the priority selection circuit 32 to be actuated. Since the signal 71 has not yet been delivered, a gate 34 also operates to cause the logic "1" to be set in the flip-flop 57 at the end of the cycle T4.

Accordingly, the SELINH signal 71 continues to be delivered during the cycle T5 and since the gate 35 is not operated, no set pulse is received by the selection permission signal register 56. As a result of the above-described control, the selection permission signal 67 continues to be delivered also in the cycle T6.

On the other hand, while the SELINH signal 71 is being delivered, the gate 34 is not operated so that the logic "0" is set in the flip-flop 57 at the end of the cycle T5. Consequently, the gate 35 is operated again in the cycle T6, a set pulse is received by the selection permission signal register 56, and therefore the selection permission signal 67 is interrupted at the beginning of the cycle T7.

With this manner of control, the selection permission signal 67 is being delivered for a period of 150 ns covering the cycles T5 and T6. Accordingly, the data transfer between the processor 23 and the memory 22 is executed for 150 ns (T5+T6). This length of time, i.e. 150 ns, may be a suitable value in view of the parity check of the bus and the signal delay on the backplane.

With the beginning of the cycle T5, the flip-flop 54 is reset by the signal 67 so that the common bus occupation demand signal 69 is interrupted. Therefore, the occupation of the common bus 21 by the processor 23 is canceled and a demand for the occupation of the common bus 21 by another processor can be accepted.

A demand by the processor 25 is somewhat different in operation from that by the processor 23 since the machine cycle of the processor 25 is 225 ns. The memory demand signal 66, delivered for the machine cycle covering the cycles T4, T5 and T6, is set in the flip-flop 55 at the beginning of the cycle T6 in response to the timing signal 63. The set signal is then sent as a common bus occupation demand signal 70 to the selection control device 26. At this time, since there is not a common bus demand signal 69 by the processor 23, the selection register 56 is set at the beginning of the cycle T7 so that a selection permission signal 68 is delivered. This signal 68 resets the flip-flop 55 at the beginning of the cycle T7 and therefore the common bus occupation demand signal 70 is interrupted. As described above with the processor 23, on the other hand, the SELINH signal 71 is delivered for the cycle T7, whereby the signal 68 continues to be held till the end of the cycle T8. In this way, the data transfer between the processor 25 and the memory 22 can be performed for a period of 150 ns (T7+T8).

As described above, a clock signal whose repetition period is shorter than the machine cycles of the processors used, is used as a master clock signal and each processor obtains its desired machine cycle by frequency-dividing the master clock signal. Moreover, by delivering a common bus occupation demand signal in synchronism with the master clock and by introducing a signal which inhibits the operation of the gate 35 controlling the bus control circuit 56 during the time of data transfer through the common bus, processors having different machine cycles can be connected with a common bus of the synchronous type which has its occupation period set equal to a desired length of time.

Further, by more elaborately designing the frequency-dividing circuits 52 and 53 associated with the master clock signal 28 so that the machine cycle may be rendered variable depending on the lengths in time of operations, each processor can be operated with various machine cycles corresponding to operations having various execution times.

As described above, according to this invention, since the machine cycles of the processors connected with the common bus of the synchronous type can be made variable, each processor can be operated at a processing speed suitable for a desired operation.

We claim:
1. A data processing system comprising:
   (a) a plurality of processors having different processing speeds;
   (b) a common bus of synchronous type with which said plurality of processors are connected;
   (c) a common memory connected with said common bus and accessed by said plurality of processors through said common bus;
   (d) bus control means connected with said common bus and including high-frequency master clock signal generating means for producing a master clock signal to be applied in common to said plurality of processors;
   (e) each said processor including means for determining a machine cycle corresponding to the processing speed thereof by frequency-dividing said master clock signal produced by said high frequency master clock signal generating means; and
   (f) wherein said bus control means comprises means including a preferential selection circuit connected to said processor and said common memory and a bus control circuit connected to said preferential selection circuit for controlling the selection of said common bus in accordance with common bus occupation demands by each of said processors and said common memory, and gate means responsive to said preferential selection circuit for controlling the operation of the bus control circuit in synchronism with the master clock signal from the high frequency master clock signal generating means.

2. A data processing system as claimed in claim 1 further comprising means for producing a signal inhibiting the operation of the gate means during the period corresponding to predetermined plural master clock pulses.

3. A data processing system comprising:
   (a) a plurality of processors having different processing speeds;
   (b) a common bus of synchronous type with which said plurality of processors are connected;
   (c) a common memory connected with said common bus and accessed by said plurality of processors;
   (d) bus control means connected with said common bus and including high-frequency master clock signal generating means for producing master clock signal common to said plurality of processors, and
   (e) each said processor including means for determining a machine cycle corresponding to the processing speed thereof by frequency-dividing said master clock signal produced by said high frequency master clock signal generating means;
   (f) one of said processors comprising a first frequency-dividing circuit producing a first clock control timing signal having a half frequency of that of the master clock signal by dividing the master clock signal and a first flip-flop circuit producing a first common bus occupation demand signal in accordance with said first clock control signal;
   (g) another of said processors comprising a second frequency dividing circuit producing a second clock control timing signal having a one-third frequency of that of the master clock signal by dividing the master clock signal and second flip-flop circuit producing a second common bus occupation demand signal in accordance with said first clock control signal;

(h) said bus control means comprising a preferential selection circuit and a bus control circuit which control the selection of said common bus in accordance with common bus occupation demands by each of the processors and the common bus and produce first and second selection permitting signals; gate means for controlling the operation of the bus control circuit in synchronism with the master clock signal from the high frequency master clock signal generating means; and means for producing inhibiting the operation of the gate means during the period corresponding to two master clock pulses.

4. A data processing system comprising:
(a) a plurality of processors having different processing speeds;
(b) a common bus of the synchronous type with which said plurality of processors are connected;
(c) a common memory connected with said common bus and accessed by said plurality of processors through said bus, data transfer between any one of the processors and the common memory through said common bus being executed in a period of predetermined fixed time not longer than one machine cycle of the processor having the fastest processing speed; and
(d) bus control means connected with said common bus and including high-frequency master clock generating means for producing a master clock signal common to said plurality of processors, and bus request selection means responsive to bus request signals from said processors for generating a bus selection permission signal to one of said processors in synchronism with said master clock signal to permit it to transfer the data through said common bus in said predetermined fixed period;
(e) each said processor including means for determining a machine cycle of a predetermined period corresponding to the processing speed thereof by frequency-dividing said master clock signal produced by said high frequency master clock signal generating means and means for generating the bus request signal in synchronism with the machine cycle.

5. A data processing system according to claim 4, wherein said bus control means comprises a priority selection circuit for performing bus selection with priority.

6. A data processing system as claimed in claim 5 further comprising means for producing a signal inhibiting the operation of the bus request selection means during the predetermined fixed period for the data transfer corresponding to predetermined plural master clock pulses.

7. A data processing system comprising:
(a) a plurality of processors having different processing speeds;
(b) a common bus of the synchronous type with which said plurality of processors are connected;
(c) a common memory connected with said common bus and accessed by said plurality of processors; and
(d) bus control means connected with said common bus and including high-frequency master clock generating means for producing a master clock signal common to said plurality of processors, and bus request selection means responsive to bus request signals from said processors for generating a bus selection permission signal to one of said processors in synchronism with said master clock signal;
(e) each said processor including means for determining a machine cycle of a predetermined period corresponding to the processing speed thereof by frequency-dividing said master clock signal produced by said high frequency master clock signal generating means and means for generating the bus request signal in synchronism with the machine cycle;
(f) one of said processors comprising a first frequency-dividing circuit producing a first clock control timing signal having a half frequency of that of the master clock signal by dividing the master clock signal and a first flip-flop circuit producing a first common bus occupation demand signal in accordance with said first clock control signal;
(g) another of said processors comprising a second frequency dividing circuit producing a second clock control timing signal having a one-third frequency of that of the master clock signal by dividing the master clock signal and a second flip-flop circuit producing a second common bus occupation demand signal in accordance with said first clock control signal;
(h) said bus control means comprising a priority selection circuit and a bus control circuit which control the selection of said common bus in accordance with common bus occupation demands by each of the processors and the common bus and produce first and second selection permitting signals; gate means for controlling the operation of the bus control circuit in synchronism with the master clock signal from the high frequency master clock signal generating means; and means for producing inhibiting the operation of the gate means during the period corresponding to two master clock pulses.

* * * * *